(12) United States Patent
Gruchala et al.

(10) Patent No.: US 7,269,408 B2
(45) Date of Patent: Sep. 11, 2007

(54) METHOD AND SYSTEM OF ALERTING CALLERS TO SURCHARGES

(75) Inventors: Carol Gruchala, Naperville, IL (US); Wayne Heinmiller, Elgin, IL (US); Dianna Tiliks, Palatine, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 46 days.

(21) Appl. No.: 11/103,883

(22) Filed: Apr. 12, 2005

(65) Prior Publication Data

US 2006/0229060 A1 Oct. 12, 2006

(51) Int. Cl.
*H04M 11/00* (2006.01)
(52) U.S. Cl. .......... 455/406; 379/221.02; 379/272; 379/273; 379/114.01
(58) Field of Classification Search .......... 455/406, 455/408, 407; 379/219, 221.02, 221.14, 379/221.08, 242, 272, 273, 110.01, 114.01, 379/114.03
See application file for complete search history.

(56) References Cited

U.S. PATENT DOCUMENTS

| | | | |
|---|---|---|---|
| 6,104,792 A | 8/2000 | Lautenschlager et al. | |
| 6,408,174 B1 | 6/2002 | Steijer | |
| 6,570,973 B1 * | 5/2003 | Boughman et al. .... | 379/207.02 |
| 6,654,599 B1 | 11/2003 | Lundström et al. | |
| 6,678,364 B2 | 1/2004 | Ruckart | |
| 6,856,675 B1 | 2/2005 | Kaiser | |
| 2004/0122684 A1 | 6/2004 | Kaikuranta | |
| 2004/0203761 A1 | 10/2004 | Baba et al. | |

\* cited by examiner

*Primary Examiner*—Nick Corsaro
*Assistant Examiner*—Sayed T. Zewari
(74) *Attorney, Agent, or Firm*—Brooks Kushman P.C.

(57) ABSTRACT

Method and system of alerting callers of surcharges associated with making phone calls. The method and system relating to calls made between affiliated and non-affiliated providers wherein the surcharges are fees incurred in service calls therebetween. The fees may be flat-rate fees or other per phone call fees which are independent of call length, duration, etc. The fees may be charged by the non-affiliated provider and/or fees incurred by the affiliate provider in servicing such calls.

19 Claims, 2 Drawing Sheets

METHOD AND SYSTEM OF ALERTING CALLERS TO SURCHARGES

BACKGROUND OF THE INVENTION

1. Field of the Invention

The present invention relates to methods and systems of alerting callers to surcharges prior to completing phone calls.

2. Background Art

Phone calls, whether they are wireless (cellular, satellite, VoIP) or wireline (plain old telephone (POTs)), are completed by routing signals from one location to another, generally between a calling party and a called party. Service providers may include features, networks, and/or other mediums to facilitate routing the signals from location to location. For some calls, a service provider may rely on services provided by another service provider in order to complete the call.

For exemplary purposes, the servicing of calls between multiple service providers may be referred to as servicing calls between affiliated and non-affiliated providers. In some instances, the non-affiliated provider may charge the affiliated provider a fee for accessing its services. The fees are typically charged on a per phone call basis. These one-time fees may be referred to as surcharges and are typically independent of other parameters associated with the call, such as call length, calling plan, etc. The non-affiliated provider typically bills the affiliated provider for the surcharge at some time after the phone call is completed. The affiliated provider then bills their customer.

One problem with servicing phone calls with a non-affiliated provider is that the customer making the call may be unaware of the surcharges associated therewith. This can be problematic for new customers who may not be aware of the fees or even for existing customers if they are unaware of rate plan changes.

DETAILED DESCRIPTION OF THE PREFERRED EMBODIMENT(S)

Figure 1:
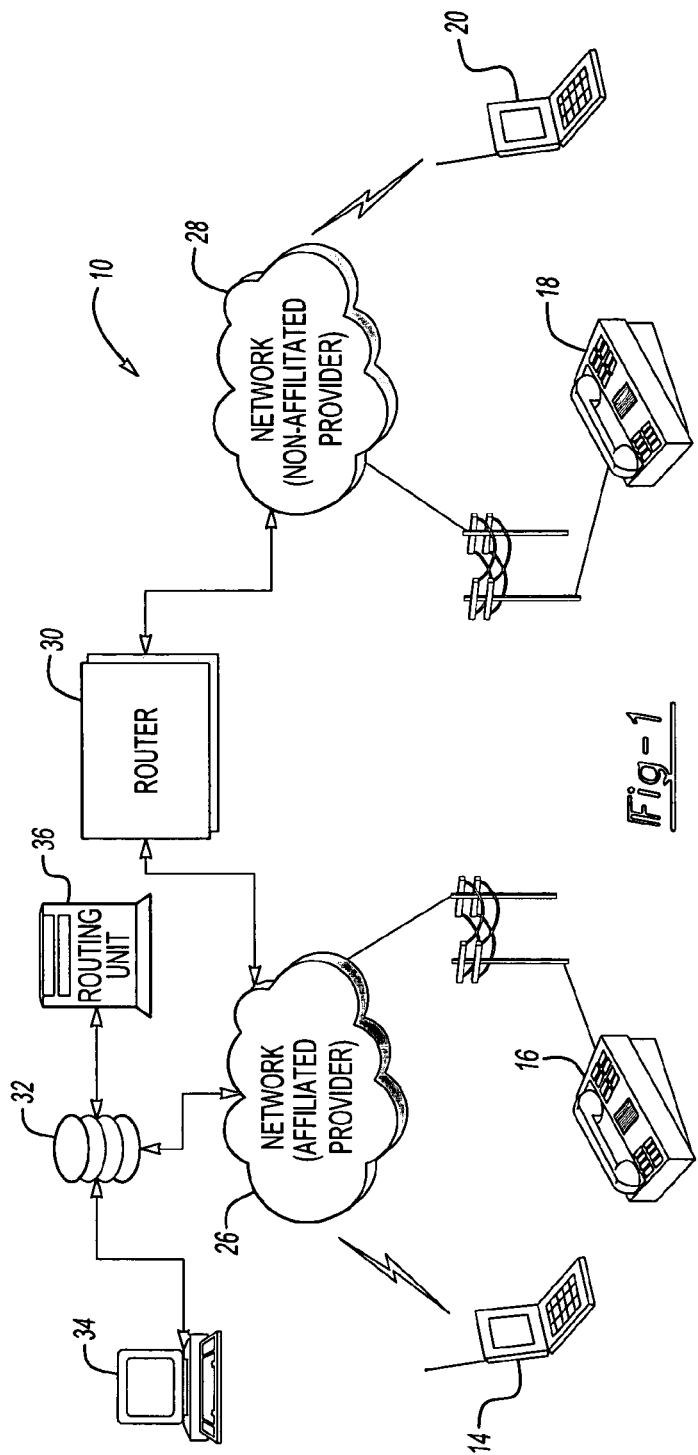
FIG. 1 illustrates a system for making phone calls in accordance with one non-limiting aspect of the present invention.

One non-limiting aspect of the present invention relates to a method and system of alerting callers of surcharges associated with making phone calls. The alert may be made prior to completing the phone calls so as to provide a caller with an opportunity to accept or reject the surcharge. The method and system may overcome the above-identified deficiencies of the prior art which fail to warn customers of surcharges associated with servicing calls between affiliated and non-affiliated providers.

One aspect of the present invention may relate to a method of alerting callers of surcharges associated with making phone calls between affiliated and non-affiliated service providers. The method may include populating a surcharge database to include a plurality of surcharges and phone number identifiers. The phone number identifiers may be cross-referenced with surcharges associated therewith. The surcharges may be charges associated with making calls which rely on services of one or more non-affiliated service providers. The method may further include determining a called party number for the phone call, determining whether the called party number is associated with any of the phone number identifiers in the surcharge database, determining a surcharge for the called party number as a function of the associated phone number identifiers, and alerting the caller of the surcharge prior to routing the call to the non-affiliated network.

One non-limiting aspect of the present invention may relate to a method of alerting callers of surcharges associated with making an international phone call. The method may include determining a surcharge associated with making the phone call. The surcharge being a fixed rate, per phone call charge incurred by a national provider of a calling party in servicing the international phone call. The surcharge including charges billed to the national provider by an international provider for servicing the international phone call. The method may further include alerting a calling party of the surcharge prior to completing the international phone call.

One non-limiting aspect of the present invention relates to a system of alerting callers of surcharges associated with making phone calls between affiliated and non-affiliated service providers. The system may include a surcharge database configured to include a plurality of surcharges and phone number identifiers. The phone number identifiers being cross-referenced with surcharges associated therewith. The surcharges may be charges associated with making calls which rely on services of one or more non-affiliated service providers. The system may further include a call routing unit in communication with the database and configured to: determine a called party number for the phone call; determine whether the called party number is associated with any of the phone number identifiers in the surcharge database; determine a surcharge for the called party number as a function of the associated phone number identifiers; and alert the caller of the surcharge prior to routing the call to the non-affiliated network.

The above features and advantages, along with other features and advantages of the present invention, are readily apparent from the following detailed description of the invention when taken in connection with the accompanying drawings.

FIG. 1 illustrates a system 10 for making phone calls in accordance with one non-limiting aspect of the present invention. The system 10 may be configured to route or otherwise communicate phone calls between one or more phones 14-20. The calls may be based on wireless (cellular, satellite, etc.) and/or wireline (plain old telephone (POTs), VoIP, etc.) technologies.

The present invention contemplates an environment where callers make calls from one location to another non-affiliated location. The non-affiliated location may be within the same country and/or geographical area and/or it may be more remotely located, such as for international or non-regional calls. One or more networks 26-28 may be provided by one or more service providers to facilitate routing or otherwise servicing the calls.

For exemplary purposes of the present invention, the servicing of calls between multiple service providers may be referred to as servicing calls between affiliated and non-affiliated providers if a surcharge is incurred as a function thereof. The surcharge may be an access fee, service fee, or other charge incurred to the calling party provider for servicing the call. The surcharge is a one-time or flat-fee charge made on a per phone call basis. These one-time fees are independent of other fees attendant to making the call, such as fees based on call length, calling plan, etc. This addresses the charges over and above any charges or calling plan arrangement the calling party has with their provider—either flat rate or per call.

The use of affiliated and non-affiliated providers in the context of the present invention is intended to cover any calls where a calling party provider (affiliated) is billed for accessing or otherwise leveraging off of services provided by one or more networks or features of a called party provider (non-affiliated), or other intermediaries therebetween that may become involved in servicing the call. The calls may comprise local, regional, national, and/or international calls.

The surcharge may result directly from the called party provider or other intermediaries between the called party provider and the calling party provider. For example, the called party provider or other intermediary may charge a one-time access or service fee for routing or servicing signals through its network. This surcharge may be billed directly to the calling party provider, as opposed to the calling party. Because the calling party provider incurs a surcharge, the call is considered, for the purposes of the present invention, to be between an affiliated provider (calling party) and non-affiliated provider (called party).

The present invention contemplates any number of applications, including national wireline or wireless calls where one provider may require access or services of another provider in order to place the call. For example, a calling party cellular provider may require services associated with a called party cellular provider which operates in the same geographical area or within the same country or state. If the called party cellular provider bills the calling party cellular provider for such access or other services, the called party cellular provided is considered, for the purposes of the present invention, to be a non-affiliated provider.

Likewise, the called party cellular provider may be considered a non-affiliated provider even if it does not charge the calling party cellular provider, such as if the calling party cellular provider otherwise incurs surcharges for servicing the call. For example, the calling party cellular provider may incur costs associated with purchasing hardware or other features for supporting communications with non-affiliated networks, such as to support a router 30 or other feature used to transfer signals between affiliated and non-affiliated provider networks. The providers may desire to pass the charges associated therewith, or a fraction of the charges, onto to the calling party in the form of a surcharge. As such, and even though the called party cellular provider does not bill the calling party cellular provider, it, for the purposes of the present invention, may still be considered a non-affiliated provider because surcharges are incurred in completing the call.

The present invention also contemplates international applications where the phone calls may be routed from a national network (affiliated) to an international network (non-affiliated). Surcharges are typically applied to international calls by providers of or governments associated with the international network. As described above, the international network may be considered as a non-affiliated network even it does not bill for its services or access if the calling party provider otherwise incurs surcharges or fees for servicing the call.

The system 10 may further include a surcharge database 32 and computer 34 or other feature in communication therewith. The computer 34 may be used to input surcharges to the surcharge database 32 and/or to direct or otherwise control applications or other features for automatically gathering the surcharges. It may also be used to input other logic and features thereto, such as processors, memories, and other features associated with executing software applications and other logical processes. The surcharge database 32, as described below in more detail, may include capabilities for alerting customers making phone calls of surcharges attendant thereto, and in some cases, the surcharges associated therewith.

The system may further include a call routing unit 36 for interacting with the surcharge database 32 and the affiliated network 26. The call routing unit 36 may be configured to detect new phone calls and to control the servicing thereof so as to permit the calling party to be alerted of surcharges associated therewith. The call routing unit 36 may be configured to perform any number of operations and configured to support any number of services. The call routing unit 36 is shown as a separate feature but the present invention is not so limited. The call routing unit 36 and/or the functionality associated therewith may be integrated into any of the other features shown in FIG. 1.

The networks 26-28 may be public telephone switching networks (PSTNs), advanced intelligent networks (AINs), wireless intelligent networks (WINs), time division multiplex (TDM) networks, packet switching or IP networks, VoIP networks, and the like. The networks may include any number of features to facilitate routing or otherwise servicing phone calls, including central offices (COs), service switching points (SSP), soft switches, signal transfer points (STPs), service control points (SCPs), service nodes (SNs), service package applications (SPAs), wireless cells, mobile switching centers (MSCs), home location registers (HLRs), visitor location registers (VLRs), server offices, server switches, feature servers, application program interfaces (APIs), and the like.

The phones 14-20 may be cellular phones, satellite phones, plain old telephone phones, VoIP enabled phones, and the like. The phones 14-20 may be assigned phone numbers or other identifying characteristics, such as IP addresses or other addressing information. The phone numbers and/or address may be pre-assigned or dynamically assigned. The phones 14-20 may be standalone features and/or integrated into other applications, such as into computers, modems or other devices.

The present invention contemplates any number of configurations, features, and arrangements for servicing calls between any number of phones 14-20, at any number of locations. The present invention fully contemplates any number of other alternatives to facilitate routing and service phone calls, data exchange, or other communications between affiliated and non-affiliated providers and/or networks. The present invention fully contemplates the use of more or less of the above-mentioned features and is not intended to be limited to the foregoing.

Figure 2:
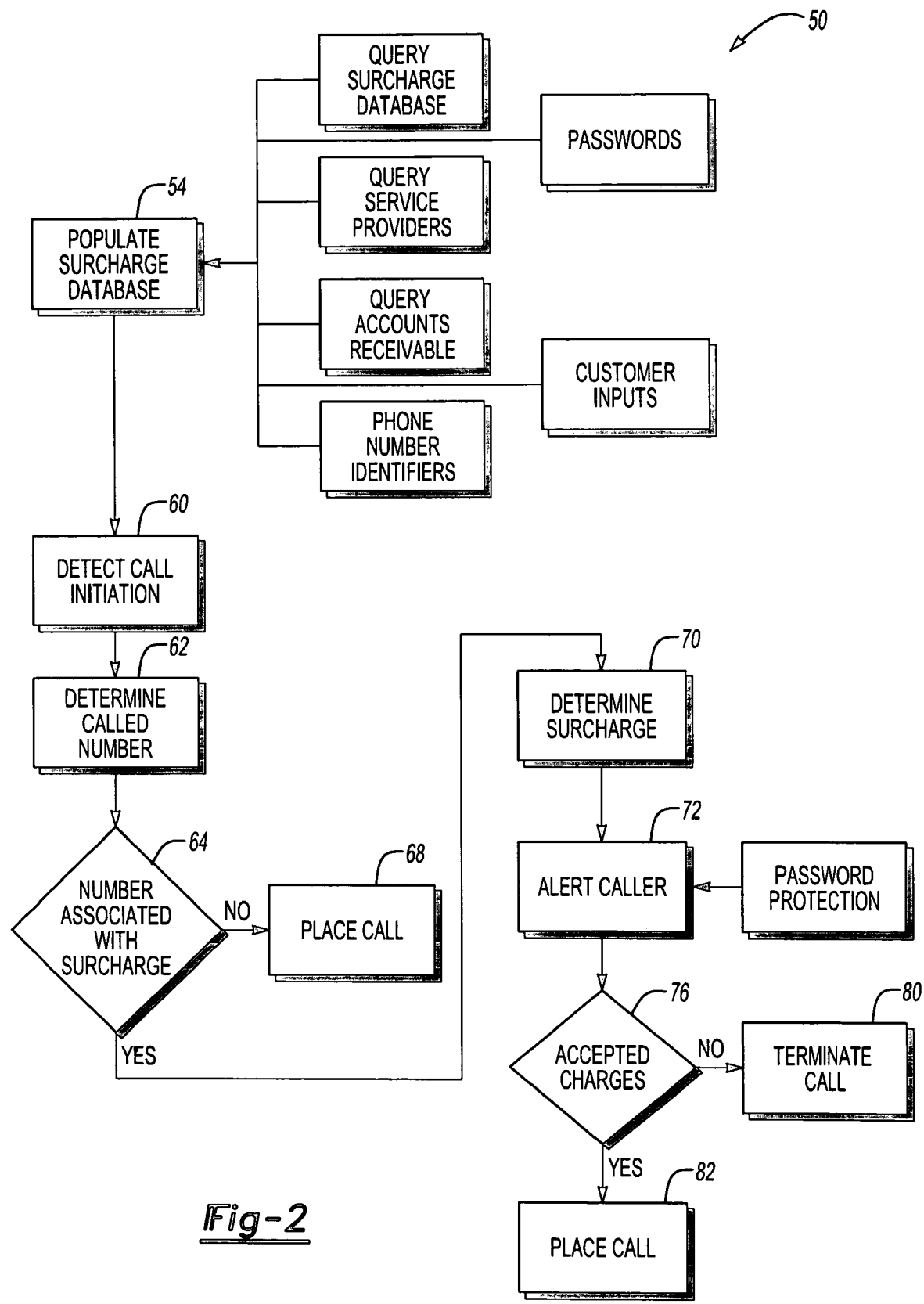
FIG. 2 illustrates a flowchart of a method of alerting a caller of surcharges associated with making a phone call in accordance with one non-limiting aspect of the present invention.

FIG. 2 illustrates a flowchart 50 of a method of alerting a caller of surcharges associated with making a phone call in accordance with one non-limiting aspect of the present invention. The method applies to calls made between affiliated and non-affiliated networks which, as described above, relates to any call where a surcharge is applied to complete the call. The use of the terms affiliated and non-affiliated is not intended to limit the scope and contemplation of the present invention or to require or not require any particular relationship between the providers.

Block 54 relates to populating the surcharge database with surcharges and phone number identifiers. The surcharges may be cross-referenced, linked, or otherwise associated with the phone number identifiers in a look-up table, relational database, or other memory related device or logic. The surcharge database is intended to provide a location for storing phone number identifiers with surcharges associated therewith.

Figure 3:
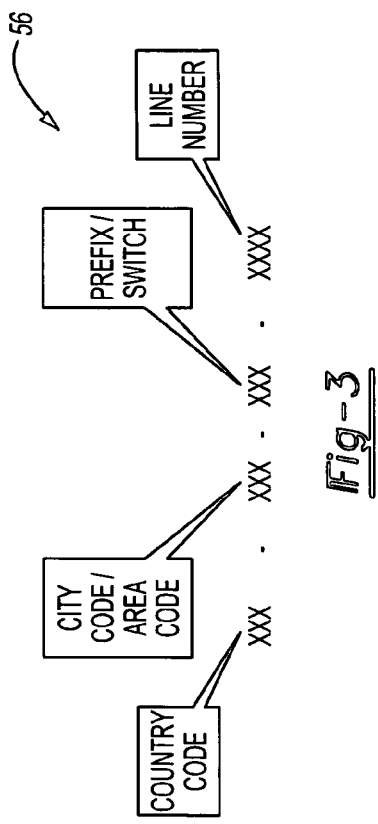
FIG. 3 illustrates an exemplary phone number identification system in accordance with one non-limiting aspect of the present invention.

FIG. 3 illustrates one exemplary phone number identification system 56 which may be employed with the present invention. The phone number identification system includes a country code, area/city code, prefix, and line number identifiers.

The country code is typically associated with international dialing and provided to assist in routing calls to a country or specific geographical area associated therewith. The area/city code provides more precise indications of geographical areas within the country or geographical areas associated with the country code. The prefix and line number specify a specific switch or other location specific unit associated with the phone or other communications device within the area/city associated with the reaching of the called party. Of course, as described above, the present invention contemplates any number of addressing and identification systems and methodologies to assist in locating phones and/or other communications devices and is not intended to be limited to the foregoing.

The surcharges may be coordinated with one or more of the identifiers included within the phone number or other addressing used to locate the phone or other communication device. A called phone number may be cross-referenced against the phone number identifiers and associated with one or more of the surcharges as a function thereof.

The country codes may be associated with surcharges such that surcharges may be determined for each called number having a matching or corresponding country code. The area/city codes may be associated with surcharges such that one or more surcharges may be determined as a function of a surcharge associated with the country code and a surcharge associated with the area/city code, i.e., if separate surcharges are assigned for each. Likewise, the area/city code identifier may be used alone, such as in the case of local or regional calls within the same country or geographical area. The prefix and line number (commonly referred to as a destination number) may be associated with surcharges such that surcharges may be determined as a function of the country code, area/city code, and/or destination number.

Each identifier may be associated with various surcharges. For example, an international call may be associated with one (country code), two (country code plus area/city code), and/or three (country code plus area/city code plus destination number) surcharges. The value associated with the surcharges may be determined according to any number of operations and parameters.

The surcharges may be determined by querying a voluntary surcharge database. The voluntary surcharge database may be populated with surcharges of various service providers, such as the LERG database. The surcharges may be determined by querying the providers directly, such as through monthly emails or similar operations. The surcharges may be determined by reviewing customer bills, such as through an automated process which queries customer accounts for previously charged surcharges. The surcharges may be determined by customers inputting or otherwise calculating the surcharges themselves. Optionally, the customer inputted surcharges may have limited access, such as to permit only the customers who inputted the surcharges to have access thereto. This may prevent the spread of complications and erroneous surcharges.

The value assigned to the surcharges may be based solely on values charged by the non-affiliated providers or governments associated therewith. The values, however, may be adjusted with algorithms or other logical operations, which may be referred to as an adjusted surcharge. The provider associated with the calling party, for example, may increase the surcharges to compensate for other costs associated with servicing calls to non-affiliated providers and/or it may decrease the surcharge for customers having pre-paid plans or other calling plans.

As described above, the surcharges may arise from other sources and operations which are not derived from services rendered by a non-affiliated provider. Surcharges may be associated with any number of operations and similarly populated into the database. For example, the calling party provider may associate hardware, maintenance, service, and other cost with particular phone numbers or phone number identifiers. These so called affiliated provider surcharges may be added in place of or in addition to other surcharges associated with the same or similar phone number identifiers.

Multiple surcharges may be associated with each phone number identifier. For example, multiple surcharges may be determined if multiple service providers are relied upon to service the call and/or if the calling provider includes additional surcharges on top of those charged by the non-affiliated providers.

Passwords and other parameters may be associated with the surcharges. The passwords may relate to user names, PINs, or other features intended to provide password protection. As described below in more detail, the calling party may be required to input the password in order to complete a call associated with the surcharges, such as to prevent unauthorized calling. The passwords may be determined and assigned in any manner, such as by customers individually or automatically by the affiliated provider.

Block 60 relates to a calling party initiating a phone call to a called party. The phone call initiation may be determined by a switch or other AIN trigger. The call initiation preferably includes determining whether the calling party is associated with a call surcharge application. The call surcharge application may relate to a program or other operation associated with alerting the calling party of surcharges associated with making the phone call. For the purposes of the present invention, it is assumed that the calling party is associated with such an application.

Block 62 relates to determining a called party number associated with the called party. The called party number preferably relates to a telephone number associated with the called party which is inputted into one of the phones of the calling party. However, as described above, the present invention is no so limited and contemplates other dialing and addressing operations which are not necessarily reliant on 10+ digit telephone numbers.

Block 64 relates to determining whether the called party number is associated with any of the phone number identifiers in the surcharge database. This may include reviewing a portion of the surcharge database 32 assigned to a customer associated with the calling party and/or reviewing a general surcharge database assigned to all possible phone numbers.

The determination of block 64 may include any number of operations and logical functions and is preferably executed in a timely fashion so as to facilitate rapid call placement. To speed call placement, for example, the surcharge database 32 may only include phone number identifiers having surcharges associated therewith, as some phone number identifiers may not include surcharges.

The determination of block 64 may include searching the surcharge database 32 for only a portion of the called party phone number rather than searching for a complete match, such as searching for only the country code, country code plus area/city code, etc. Preferably, however, once a match is made, any additional surcharges are included therewith.

Block 68 relates to automatically placing the call if no surcharge is associated therewith. The call placement may including routing the call through wireless (cellular, satellite, VoIP, etc.) and/or wireline (plain old telephone (POTs)) technologies, as one skilled in the art will appreciated.

Block 70 relates to determining the surcharge associated with the called party. The surcharge may be determined by adding up or otherwise tabulating a value from the one or more surcharges associated with the called party phone number, as described above in more detail.

Block 72 relates to alerting the calling party of the surcharge(s) associated with making the desired phone call. The alert may include any number of messaging operations or multi-media displays, including playing an audible message through a headset or display a text message on the phone. The alert may also take other forms if the calling device is not a typical wireline or wireless phone, such as if it is a modem, computer, or other communication device.

Block 76 relates to determining whether the calling party accepts or denies the charges. This may include any number of operations and receiving any number of inputs from the calling party, such as requiring the calling party to accept the charges by pressing a sequence of numbers or saying a sequence of statements. Optionally, the calling party may be required to input a password in order to accept the charges if the alert includes a password notification or other password protection prompt.

Block 80 relates to terminating the call if the calling party denies the charges or fails to input the proper password. Block 82 relates to placing the call if the calling party accepts the surcharges and enters the proper password(s), if password protections is enabled.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of alerting a caller associated with an affiliated service provider of a surcharge for a phone call from the caller to a called party associated with a non-affiliated service provider, the method comprising:

populating a surcharge database to include phone number identifiers of callable parties associated with the non-affiliated provider and to include surcharges such that each phone number identifier is associated with a surcharge, wherein a surcharge associated with a phone number identifier of a callable party represents a fee of the non-affiliated provider for use of the non-affiliated provider network to complete a phone call from a caller associated with the affiliated provider to the callable party;

determining a called party phone number of a phone call from a caller associated with the affiliated provider to a called party;

determining whether the called party phone number is associated with any of the phone number identifiers in the surcharge database to determine whether the phone call is subject to a surcharge;

if the called party phone number is associated with a phone number identifier in the surcharge database, determining the surcharge in the surcharge database for the called party phone number as a function of the associated phone number identifiers; and alerting the caller of the determined surcharge including the associated fee prior to routing the call from the affiliated network to the non-affiliated network to complete the call from the caller to the called party.

2. The method of claim 1 wherein:

populating the surcharge database includes querying a voluntarily populated surcharge database populated by non-affiliated providers to indicate surcharges associated therewith.

3. The method of claim 1 wherein:

populating the surcharge database includes querying non-affiliated providers for surcharges associated therewith.

4. The method of claim 1 wherein:

populating the surcharge database includes querying customer accounts for previously charged surcharges.

5. The method of claim 1 wherein:

populating the surcharge database includes the caller inputting surcharges to the surcharge database.

6. The method of claim 5 wherein:

determining the surcharge in the surcharge database for the called party phone number includes determining the surcharge from the caller inputted surcharges only if the surcharge is associated with the caller making the phone call.

7. The method of claim 1 further comprising:

automatically completing the phone call without determining the surcharge if the called party phone number is not associated with any of the phone numbers identifiers in the surcharge database so as to expedite call placement.

8. The method of claim 1 wherein:

determining whether the called party phone number is associated with any of the phone number identifiers in the surcharge database includes only determining whether a country code phone number identifier associated with a surcharge is associated with any of the phone number identifiers in the surcharge database so as to expedite call placement.

9. The method of claim 1 further comprising:

associating a password with one or more of the surcharges in the surcharge database and requiring password confirmation prior to completing phone calls if the surcharge associated therewith is password protected.

10. The method of claim 1 further comprising:

adjusting at least one surcharge in the surcharge database to an adjusted surcharge as a function of a surcharge algorithm associated therewith.

11. The method of claim 1 wherein:

the phone number identifiers are limited to country code identifiers such that only a country code of the called party phone number is analyzed to determine whether the called party phone number is associated with any of the phone number identifiers in the surcharge database.

12. The method of claim 1 wherein:
the phone number identifiers are limited to country code and city code identifiers such that only a country code and city code of the called party phone number is analyzed to determine whether the called party phone number is associated with any of the phone number identifiers in the surcharge database.

13. The method of claim 1 wherein:
populating the surcharge database with surcharges includes determining fees incurred by the affiliated provider in servicing phone calls to one or more non-affiliated service providers.

14. A method of alerting a caller associated with an affiliated service provider of a surcharge for an international phone call from the caller to a called party associated with a non-affiliated international service provider, the method comprising:
populating a surcharge database to include phone number identifiers of callable parties associated with the non-affiliated international provider and to include surcharges such that each phone number identifier is associated with a surcharge, wherein a surcharge associated with a phone number identifier of a callable party represents a fee of the non-affiliated international provider for use of the non-affiliated international provider network to complete an international phone call from a caller associated with the affiliated provider to the callable party;
determining a called party phone number of an international phone call from a caller associated with the affiliated provider to a called party;
determining whether the called party phone number is associated with any of the phone number identifiers in the surcharge database to determine whether the international phone call is subject to a surcharge;
if the called party phone number is associated with a phone number identifier in the surcharge database, determining the surcharge in the surcharge database for the called party phone number as a function of the associated phone number identifiers;
alerting the caller of the determined surcharge including the associated fee prior to routing the international phone call from the affiliated network to the non-affiliated network to complete the international phone call from the caller to the called party.

15. The method of claim 14 further comprising:
automatically updating the surcharges in the surcharge database.

16. The method of claim 14 further comprising:
associating a password with one or more of the surcharges in the surcharge database and requiring password confirmation prior to completing international phone calls if the surcharge associated therewith is password protected.

17. The method of claim 14 further comprising:
populating the surcharge database as a function of surcharges determined by at least one of the following:
querying a voluntarily populated surcharge database;
querying non-affiliated international providers for surcharges associated therewith;
querying caller party accounts of caller parties associated with the affiliated service provider for previously charged surcharges;
permitting calling parties associated with the affiliated service provider to input surcharges; or
determining fees incurred by the affiliated provider in servicing calls to one or more non-affiliated international service providers.

18. A system of alerting a caller associated with an affiliated service provider of a surcharge for a phone call from the caller to a called party associated with a non-affiliated service provider, the system comprising:
a surcharge database configured to include a plurality of surcharges and phone number identifiers of callable parties associated with the non-affiliated provider such that each phone number identifier is associated with a surcharge, wherein a surcharge associated with a phone number identifier of a callable party represents a fee of the non-affiliated provider for use of the non-affiliated provider network to complete a phone call from a caller associated with the affiliated provider to the callable party; and
a call routing unit in communication with the database and configured to:
determine a called party phone number of a phone call from a caller associated with the affiliated provider to a called party;
determine whether the called party phone number is associated with any of the phone number identifiers in the surcharge database to determine whether the phone call is subject to a surcharge;
if the called party phone number is associated with a phone number identifier in the surcharge database, determine the surcharge in the surcharge database for the called party phone number as a function of the associated phone number identifiers; and
alert the caller of the determined surcharge including the associated fee prior to routing the call from the affiliated network to the non-affiliated network to complete the call from the caller to the called party.

19. The system of claim 18 wherein the surcharge database includes surcharges determined from one or more of the following sources:
a voluntarily populated surcharge database;
bills received from non-affiliated providers;
caller accounts having previously charged surcharges;
caller inputted surcharges; or
fees incurred by the affiliated provider in servicing calls to one or more non-affiliated service providers.

* * * * *